(No Model.)
W. E. BELL, J. J. LEE & J. T. DRUMMOND.
WIRE REEL AND STRETCHER.
No. 429,673. Patented June 10, 1890.
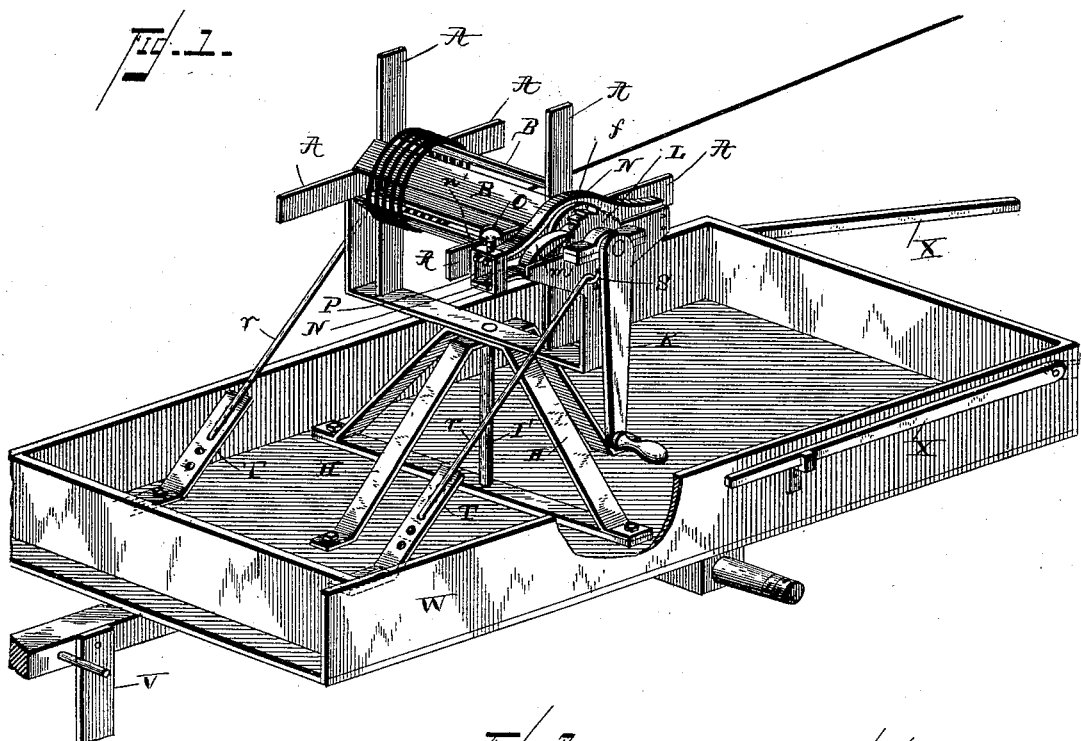
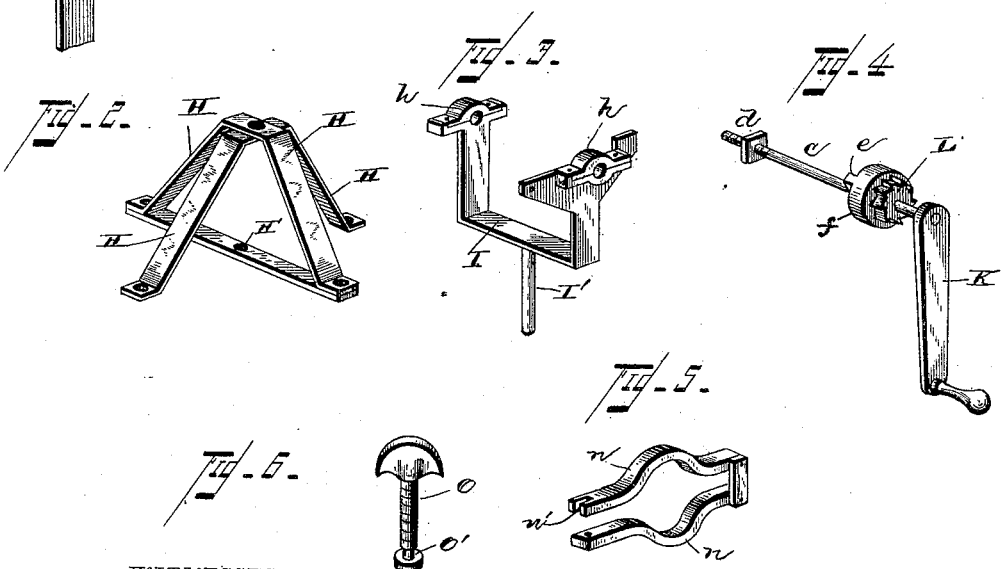
WITNESSES
F. L. Durand
E. Moore
INVENTORS
William E. Bell
John J. Lee
James T. Drummond
By Jas. T. Drummond
Attorney

UNITED STATES PATENT OFFICE.

WILLIAM E. BELL, OF DONNELSON; JOHN J. LEE, OF MOUNT HAMMEL, AND JAMES T. DRUMMOND, OF MOUNT PLEASANT, IOWA.

WIRE REEL AND STRETCHER.

SPECIFICATION forming part of Letters Patent No. 429,673, dated June 10, 1890.

Application filed March 7, 1890. Serial No. 342,964. (No model.)

*To all whom it may concern:*

Be it known that we, WILLIAM E. BELL, a citizen of the United States, residing at Donnelson, in the county of Lee and State of Iowa; JOHN J. LEE, a citizen of the United States, residing at Mount Hammel, in the county and State above named, and JAMES T. DRUMMOND, a citizen of the United States, residing at Mount Pleasant, in the county of Henry and State of Iowa, have invented a new and useful Improvement in Wire Reels and Stretchers for Constructing and Moving Wire Fences, of which the following is a specification.

In the accompanying illustrative drawings, which constitute part of this specification, Figure 1 is a perspective of the machine mounted on a hand-cart. Fig. 2 shows the legs or lower standards of the reel-stand. Fig. 3 is the adjustable reel-support. Fig. 4 shows the spool-shaft and its attachments detached. Fig. 5 is a pair of spring-clamps for producing friction on a circular disk on the reel-shaft as a means of tightening the same while unwinding wires therefrom; and Fig. 6 is a thumb-screw for tightening and loosening said clamps, as required in use.

Similar reference-letters indicate like parts throughout and dotted lines not otherwise explained parts hidden from view.

A refers to the cross-bars, forming the heads or ends of an ordinary wire-spool. B are the connecting-cleats, constituting the shaft of said spool.

C is a reel-shaft extending through the ends of the spool, upon which it is rigidly fastened by means of tightening a screw-nut *d* against it, which also causes a projecting lug *e* on a circular friction-disk *f* on said shaft, at the opposite end of the spool, to engage therewith. With said spool thus fastened on said shaft it is placed in the bearings *h* of the supporting-fork I of the reel-stand, in which it is rotated while winding wires thereon, by means of a crank K. This crank is operated by an attendant, who may either ride on the conveying-vehicle or walk by the side thereof. The supporting-fork is pivoted on the standards H by means of a journal I', attached to it, working in an aperture on the top of said standards and a like aperture in a coupling-bar H', so that it will be capable of horizontal rotation as a means of adjusting the spool at suitable angles for receiving wires, being wound thereon when the machine is traveling by the side of a line of fence to be taken down and removed, and for taking wires alternately from either side of the machine, so as to work back and forth along a line of fence until the job is completed. The adjustment of said parts may be slightly varied also from time to time, so as to cause a wire to wind successively from one end of a spool to the other, and then by readjusting to cause it in like manner to wind back to the opposite end again, and so continue until the spool becomes filled. Said adjustments are accomplished by slightly rotating the forked standard I, so as to throw the end of the spool toward which the winding is desired to progress relatively forward. Said parts are held in the respective required positions by means of the bracing-rods *r*, the hooks on which take into staples or eyes *s* on the forked support I and into suitable apertures in the hitching-lugs T.

A ratchet-wheel L on shaft C and a co-operative pawl *m* serve to hinder the shaft C from reversing its movement, and thereby prevents the wires from prematurely unwinding at such times as the attendant may for any cause relax his hold of the crank K. For unwinding wires in constructing a fence the pawl *m* is thrown out of contact with the teeth of the ratchet-wheel L, and the spring-clamps *n n* are tightened to the periphery of the disk *f*, so as to retard the turning thereof, by means of a thumb-screw *o*, which works in the upper end of a stirrup P. Said stirrup is placed over the swinging ends of the clamp *n n*, and is rigidly fastened to the lower end, while the end of the other or upper clamp-arm is permitted to oscillate therein, as operated by the screw *o*, and is made with a fork *n'* in it, fitting a circumferential groove *o'* on the point of said screw, so that by turning the screw forward said clamp will be tightened to the periphery of the disk *f*, thereby preventing too free unwinding of the wires. In placing the wires in position by the side of a row of fence-posts one end of a wire is fastened to an outer or end post in the line, and the cart or transporting-vehicle is hauled along the line by the side thereof to the opposite end, with said clamps tightened to the disk $f$, as above described, sufficiently to give proper tension to the wire being unwound. After passing the last post at the end of the line of fence said cart or transporting-vehicle is drawn around said post in line with said fence and braced in position, when the wire is stretched to the required tension for fastening to the posts by turning or rotating the reel in the proper direction, at which time the clamps $n$ $n$ should be loosened from the disk $f$ by backing the screw $o$.

W is a hand-cart, upon which the reeling mechanism is mounted, and to which it is fastened for use by bolting the feet of the standards H thereto. Said cart has a swinging pendant V, pivoted to one side of its tongue, serving as a rest for supporting it in a horizontal position while standing still. It is made thus adjustable for the purpose of adapting it to irregularities of the ground and for yielding to objects that it is liable to strike during the movements of the cart, which also has a pair of adjustable braces X at its rearward end pivoted to its sides, with their swinging ends resting against the ground when needed or folded forward along its sides when not in use, as is shown at opposite sides in Fig. 1. Said braces serve as auxiliary props to prevent the cart from backing while straining wires, and for rearward supports thereof to hold it in a horizontal position while not at work.

It will be preferable in winding wires on the spool to run the cart backward, and draw it forward for unwinding; but the device can be adjusted so as to work properly while traveling either way.

Having thus fully described our invention so as to be understood by others, what we claim as new, and desire to secure by Letters Patent, is—

1. In a wire reel and stretcher, the combination, with the rotatable shaft C, provided with a screw-nut, and with a disk $f$, carrying lug $e$, of a horizontally-oscillating supporting-fork I, provided with a journal I', working in apertures formed in standards H and coupling-bar H', substantially as shown.

2. In combination with the rotatable shaft C, having a wire spool fastened thereon and journaled in bearings $h$ in a horizontally-oscillating fork I, mounted on a hand-cart or other transporting-vehicle, and with the disk $f$, fastened on said shaft, the clamps $n$ $n$, stirrup P, and thumb-screw $o$, substantially as shown, for the purpose specified.

3. The combination of the rotary horizontal shaft C, provided with a screw-nut $d$ and disk $f$, a horizontally-oscillating fork I, provided with bearings $h$ and with a journal I', working in apertures formed in standards H and in a coupling-bar H', and a cart W, provided with bracing-rods $r$, staples or eyes $s$, and hitching-lugs T, all substantially as shown, for the purposes specified.

WILLIAM E. BELL.
JOHN J. LEE.
JAMES T. DRUMMOND.

Witnesses:
W. S. WILLIARD,
JNO. VAN VALKENBURG.

Witnesses to signature of James T. Drummond:
E. MOON,
ORN DRUMMOND.